April 30, 1963 K. L. DE BROSSE 3,087,986
OPTICAL SEARCH SYSTEM
Filed July 8, 1958
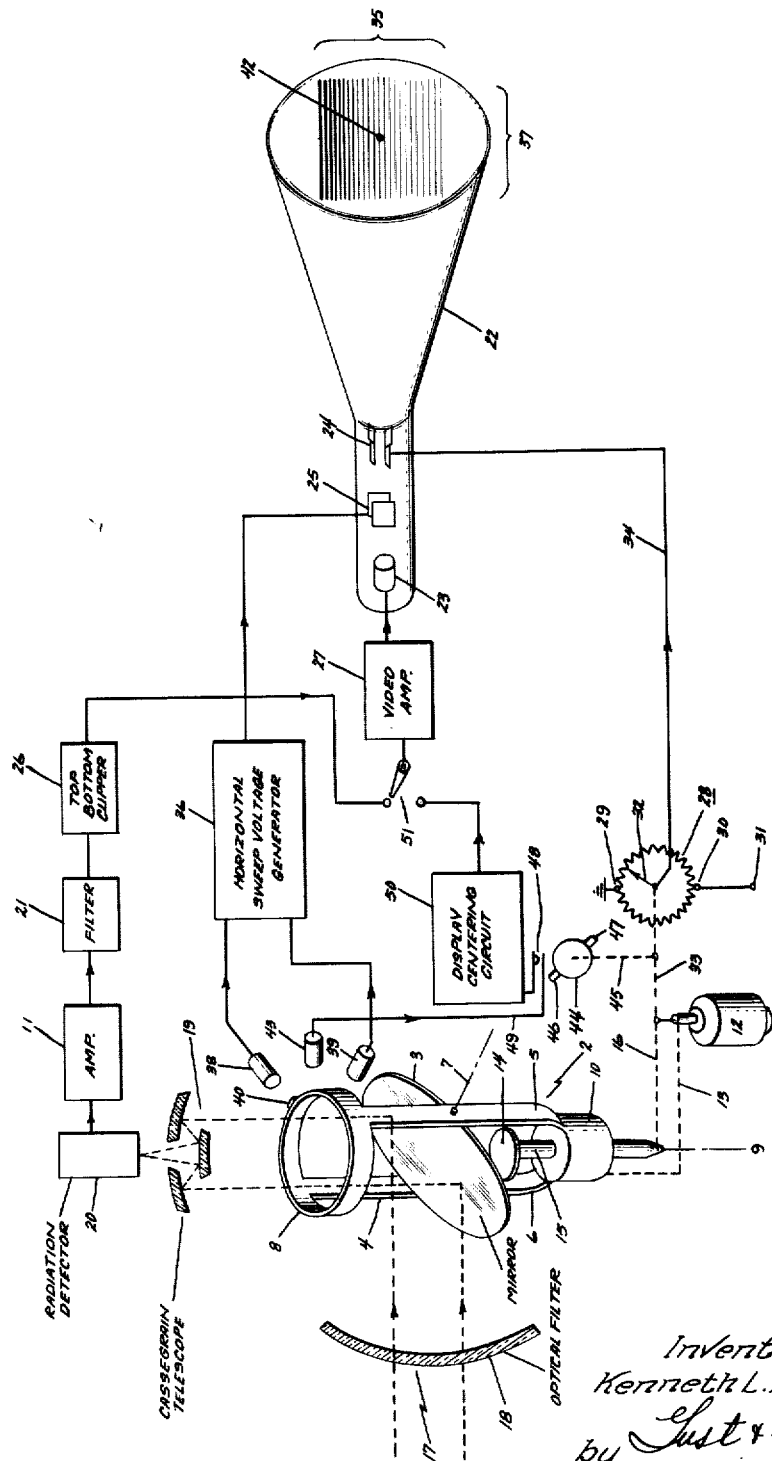
Inventor.
Kenneth L. DeBrasse,
by Just & Irish
Attorneys.

United States Patent Office 3,087,986
Patented Apr. 30, 1963

3,087,986
OPTICAL SEARCH SYSTEM
Kenneth L. De Brosse, Fort Wayne, Ind., assignor to International Telephone and Telegraph Corporation
Filed July 8, 1958, Ser. No. 748,559
11 Claims. (Cl. 178—6.8)

This invention relates generally to the field of remote object detection and location, and more particularly to an optical search system for detecting and locating a remote object by its emitted radiation.

It has in the past been proposed to detect and locate remote objects by means of their emitted radiation (having spectral characteristics in the range of visible light and heat in contrast with radiation in the radio frequency spectrum). In such prior systems, optical searching of the desired field of view has been accomplished by the use of gimbaled mirror arrangements for reflecting the radiation scanned thereby onto a radiation detection device; the gimbaled mirror arrangements previously employed have necessitated moving the detection device thus adding appreciably to the over-all complexity of the apparatus, particularly in instances where the detection device is provided with auxiliary cooling.

It is therefore desirable to provide an optical searching system arranged to scan a field of view in two dimensions in which the radiation detection device is stationary. It is further desirable that such a system be simpler and require fewer components thus involving less size and weight than prior optical searching systems known to the present applicant.

It is accordingly an object of my invention to provide an improved optical search system.

My invention in its broader aspects provides an optical search system having mechanical optical scanning means including a mirror arranged to scan a field of view in two dimensions with stationary radiation detection means being disposed to receive the radiation reflected from the mirror. Visual signal display means, such as a cathode ray oscilloscope, is coupled to the detection means and means are provided for deflecting the displayed visual signal in two dimensions responsive to the scanning of the field of view by the scanning means in the two dimensions thereof.

In the preferred embodiment of my invention, the optical scanning means includes a flat elliptical mirror with means for continuously rotating the mirror about one axis and means for simultaneously imparting a limited nodding motion thereto about a second axis at right angles to the first axis. Means are provided for continuously sensing the positions of the mirror in the plane of its nodding motion and for providing a signal responsive thereto, the continuous sensing means being coupled to the vertical deflection means of the cathode ray oscilloscope for providing vertical deflection therefor responsive to the nodding motion of the mirror. Horizontal sweep voltage generator means is coupled to the horizontal deflection means of the cathode ray oscilloscope for providing horizontal sweep therefor and means are provided for sensing two angularly spaced apart positions of the mirror in the plane of its rotation and for respectively providing signals responsive thereto, these two angularly spaced apart positions defining the limits of one dimension of the field of view. The two spaced apart position sensing means are respectively coupled to the horizontal sweep voltage generating means for respectively initiating and terminating the horizontal sweep so that the duration of the horizontal sweep is responsive to one scanning dimension of the field of view.

In further accordance with my invention, there may be provided means for sensing a position of said mirror midway between its angularly spaced positions and for providing a signal responsive thereto and other means for sensing a position of the mirror in the plane of its nodding motion midway between its extreme positions in that plane and for providing a signal responsive thereto. Means are provided for selectively coupling the two mid point sensing means to the cathode ray oscilloscope for indicating the center of the scanning raster on the oscilloscope display screen.

The above-mentioned and other features and objects of this invention and the manner of attaining them will become more apparent and the invention itself will be best understood by reference to the following description of an embodiment of the invention taken in conjunction with the accompanying drawing, wherein:

The single FIGURE of the drawing schematically illustrates the improved optical search system of my invention.

Referring now to the drawing, my improved optical search system, generally identified as 1, includes an optical scanner 2 having a flat elliptical mirror 3. Mirror 3 is pivotally mounted between arms 4 and 5 of yoke member 6 for limited nodding motion about horizontal axis 7. Arms 4 and 5 of yoke member 6 terminate at one end in a gimbal bearing, shown schematically at 8, for rotatably supporting the yoke member 6 and mirror 3 for rotation about vertical axis 9. The other ends of arms 4 and 5 of yoke member 6 terminate in another gimbal bearing 10. Yoke member 6 and mirror 3 are continuously rotated through 360° about vertical axis 9 by means of a suitable electric motor 12 having a suitable driving connection to yoke member 6, shown here schematically by dashed line 13. Limited nodding motion about horizontal axis 7 is imparted to mirror 3 by means of an eccentric rotating cam 14, cam 14 being mounted on a shaft 15 journaled in gimbal bearing 10. Cam 14 is rotated at a speed different from the speed of rotation of yoke member 6 by means of a suitable driving connection 16 between motor 12 and shaft 15; rotation of shaft 15 and cam 14 at a different speed from the rotational speed of yoke member 6 and mirror 3 imparts a simultaneous nodding motion to the mirror 3 about horizontal axis 7. A specific scanning apparatus usable with my present invention is described and illustrated in co-pending application Serial Number 748,560, filed July 8, 1958, of K. L. De Brosse and J. M. Lewis, and assigned to the assignee of the present application. As more fully described in the aforesaid De Brosse and Lewis application, yoke member 6 and mirror 3 on the one hand and cam 14 on the other hand may be respectively rotated through suitable differential gearing at speeds of 2400 r.p.m. and 2430 r.p.m. respectively, and it is thus seen that cam 14 has a net differential in rotational speed of 30 r.p.m.

Mirror 3 is adapted to receive an optical image 17, which may be passed through a suitable optical filter 18 arranged to pass radiation having the desired spectral characteristics, as is well known in the art. The optical image 17, after passing through optical filter 18, is reflected by the elliptical mirror 3 through the central opening in gimbal bearing 8 onto suitable optical focusing means 19, such as a Cassegrainian telescope, which in turn focuses the reflected optical image onto a radiation detector 20. A suitable radiation detector for this purpose is fully described and illustrated in co-pending application Serial No. 720,499, filed March 10, 1958, of Samuel G. Fong, now Patent No. 2,951,944, issued September 6, 1960, assigned to the assignee of the present application. Optical filter 18 may equally advantageously be positioned between mirror 3 and detector 20.

A suitable cathode ray tube 22 is provided, which may be a conventional cathode ray tube or alternatively a charge storage display tube, tube 22 having a conventional electron gun assembly 23 and vertical and horizontal deflection elements 24 and 25 as is well known in the art. Electron gun 23 provides the electron beam for tube 22, the beam intensity being modulated responsive to the signal provided by the radiation detector 20. Thus, radiation detector 20 is coupled to a conventional pre-amplifier 11 which in turn is coupled to a suitable filter 21 for removing undesirable frequency components, filter 21 being in turn coupled to a clipping circuit 26, to be hereinafter more fully described. Selector switch 51 couples clipping circuit 26 to video amplifier 27 which feeds the control grid (not shown) of electron gun 23 of tube 22.

The vertical deflection 35 of the electron beam provided by electron gun 23 of cathode ray oscilloscope 22 is provided responsive to the nodding motion of mirror 3. As more fully described in the aforementioned De Brosse and Lewis application, this may be accomplished by provision of a suitable rotary potentiometer 28 having diametrically opposite points 29 and 30 respectively connected to ground and to a suitable source of deflection voltage 31. Sliding element 32 of potentiometer 28 is mechanically driven by motor 12 at the differential speed of the cam 14, the driving connection being shown here by dashed line 33. Sliding element 32 of potentiometer 28 is coupled to vertical deflection element 24 of tube 22 by a connection 34, as shown, and it will thus be readily seen that the deflection voltage applied to deflection element 24 is directly related to the position of mirror 3 in the plane of its nodding motion.

A horizontal sweep voltage generator circuit 36 is provided coupled to the horizontal deflection element 25 of cathode ray tube 22 for providing horizontal sweep 37 for the electron beam provided by the electron gun 23. A pair of devices, such as position sensing reluctance pick-up devices 38 and 39 are provided in angularly spaced apart relation about gimbal bearing 8 of scanning apparatus 2, reluctance pick-up devices 38 and 39 cooperating with a slug 40 of magnetic material on gimbal bearing 8 respectively to provide two signals respectively coincident with the slug 40 rotating past pick-up devices 38 and 39. One of the pick-up devices, for instance pick-up device 38, is coupled to horizontal sweep voltage generator 36 to initiate the sweep voltage provided thereby and the other pick-up device 39 is also coupled to the horizontal sweep voltage generator 36 to terminate the sweep voltage. The angular spacing of the reluctance pick-up devices 38 and 39 corresponds to the desired field of view of mirror 3 in the plane of its rotation, and thus it will be seen that as yoke member 6 and mirror 3 rotate about vertical axis 9, when mirror 3 begins to scan the desired field of view, magnetic slug 40 will pass reluctance pick-up device 38 thus providing a signal to initiate the horizontal sweep 37 and when the mirror 3 leaves the desired field of view, slug 40 will pass pick-up device 39 to provide a second signal to terminate the horizontal sweep 37. A suitable circuit for the horizontal sweep voltage generator 36 is described in U.S. Letters Patent No. 3,002,153, issued Sept. 26, 1961, and entitled Horizontal Sweep Generator, of W. J. Williams, and assigned to the assignee of the present application.

It may be desirable selectively to provide a spot 42 of light on the face of cathode ray tube 22 to indicate the instant at which mirror 3 is midway in one frame or in other words, is in the exact center of its scanning motion; the spot 42 indicates the exact center of the display on the screen of tube 22 and thus may be used for centering cross hairs on the screen. In order to provide the display centering spot 42, another reluctance pick-up device 43 is provided spaced midway between pick-up devices 38 and 39 and cooperating with magnetic slug 40 on gimbal bearing 8 to provide a signal indicating a position of yoke member 6 and mirror 3 in the plane of its rotation about vertical axis 9 midway between the positions sensed respectively by pick-up devices 38 and 39, i.e., midway in its horizontal scan. In order to sense the position of mirror 3 in the plane of its nodding motion about horizontal axis 7, midway between its extreme positions in that plane, i.e., midway in its vertical scan, a cam 44 is provided driven by motor 12 at the same speed as sliding element 32 of potentiometer 28, i.e., at the differential speed of cam 14, the mechanical driving connection between cam 44 and motor 12 being shown in dashed lines 45. Cam 44 is provided with two lobes 46 and 47 diametrically spaced apart and disposed along a line at right angles to sliding element 32 of potentiometer 28. Lobes 46 and 47 actuate a normally open switch 48 connected in series with the line 49 leading from the pick-up 43 to the display centering circuit 50. It will now be seen that when sliding element 32 of potentiometer 28 is either at point 29 or point 30 thus indicating that mirror 3 is in one or the other of its extreme positions in its plane of nodding motion, i.e., in its vertical scanning motion, lobes 46 and 47 of cam 44 are at their extreme positions away from switch 48. However, when sliding element 32 of potentiometer 28 is midway between points 29 and 30 thus indicating that mirror 3 is midway between its extreme positions in its plane of nodding motion about horizontal axis 7, one or the other of the lobes 46—47 of cam 44 will close switch 48. Switch 48 couples the signal of pick-up 43 to video amplifier 27 through selector switch 51. Thus, with switch 51 in its "center" position, when a signal is provided by reluctance pick-up device 43 indicating that mirror 3 is midway in the plane of its horizontal scan and the switch 48 is simultaneously closed resulting from the mirror 3 being midway in its vertical scan, the pick-up 43 signal is fed to the video amplifier 27 to cause electron gun 23 to emit an electron beam which is displayed as a spot on the oscilloscope at the exact center of the scanning raster. After the cross hairs have been centered on spot 42, switch 51 may be returned to its "video" position so that video signals from detector 20 are displayed on the screen of tube 22.

In order to prevent an incident optical image 17 of extreme brilliance from in essence blinding the display on cathode ray oscilloscope 22, clipping circuit 26 is provided arranged to clip the signal from the radiation detector 20 at a predetermined upper level, as is well known in the art. Furthermore, in order to eliminate spurious low level signals from the display on cathode ray oscilloscope 22, clipping circuit 26 likewise clips the signal provided by radiation detector 20 at a lower predetermined level, i.e., only signals between the upper and lower predetermined levels are passed by the clipping circuit 26.

In an actual optical search system constructed in accordance with my invention, mirror 3 was arranged for nodding motion, i.e., vertical scanning through forty (40°) degrees and horizontal scanning, i.e., azimuth, through ninety (90°) degrees. With mirror 3 rotating at a speed of 2400 r.p.m., cam 14 providing the nodding motion having a relative rotational speed of 30 r.p.m., i.e., simultaneous rotation at forty cycles per second and nodding at one-half cycle per second, a frame time of one second is provided. It will be observed that the rotating mirror 3 is active in gathering radiation for only ninety (90°) degrees of its total 360° rotation, however, the continuous rotation of mirror 3 eliminates sharp oscillating motions provided in prior scanning apparatus known to the present applicant.

It will now be seen that I have provided an improved optical searching system characterized in that the radiation detecting device is stationary and the complex mechanisms provided in prior devices are eliminated.

While I have described above the principles of my invention in connection with specific apparatus, it is to be clearly understood that this description is made only by way of example and not as a limitation to the scope of my invention.

What is claimed is:

1. A system for optically searching through a field of view defined by a first predetermined angle in an azimuth plane and a second predetermined angle in a vertical plane comprising: a flat mirror; means for continuously rotating said mirror about one axis perpendicular with respect to said azimuth plane; means for simultaneously imparting a limited nodding motion to said mirror through said second angle about a second axis at right angles to said one axis and to said vertical plane; radiation detection means for receiving radiation reflected from said mirror and for providing a signal responsive thereto, said radiation detection means being stationary with respect to said azimuth and vertical planes; a cathode ray oscilloscope having electron beam producing means and vertical and horizontal beam deflection means, means coupling said electron beam producing means to said detection means for varying the intensity of said electron beam responsive to said signal; means coupling said nodding motion imparting means and said vertical deflection means for providing vertical deflection of said electron beam directly related to said nodding motion of said mirror; horizontal sweep voltage generator means coupled to said horizontal deflection means for providing horizontal sweep of said electron beam; means operatively associated with said mirror rotating means for providing signals respectively coincident with two spaced rotational positions of said mirror defining said first angle therebetween; and means coupling said last named means to said horizontal sweep voltage generator means for respectively initiating and terminating said horizontal sweep responsive to said last named signals.

2. A system for optically searching through a field of view defined by a first predetermined angle in an azimuth plane and a second predetermined angle in a vertical plane comprising: a flat mirror; means for continuously rotating said mirror about one axis perpendicular with respect to said azimuth plane; means for simultaneously imparting a limited nodding motion to said mirror through said second angle about a second axis at right angles to said one axis and to said vertical plane; radiation detection means for receiving radiation reflected from said mirror and for providing a signal responsive thereto, said radiation detection means being stationary with respect to said azimuth and vertical planes; a cathode ray oscilloscope having electron beam producing means and vertical and horizontal beam deflection means, means coupling said electron beam producing means to said detection means for varying the intensity of said electron beam responsive to said signal; means for continuously sensing the positions of said mirror in the plane of its nodding motion and for providing a signal directly related thereto; means coupling said continuous sensing means to said vertical deflection means for providing vertical deflection of said beam responsive to said last-named signal; horizontal sweep voltage generator means coupled to said horizontal deflection means for providing horizontal sweep of said beam; means for sensing two spaced apart positions of said mirror in the plane of its rotation defining said first angle therebetween and for respectively providing signals coincident therewith, and means coupling said last named sensing means to said horizontal sweep voltage generating means for respectively initiating and terminating said horizontal sweep.

3. The combination of claim 1 further comprising: means coupled to said beam producing means for selectively providing a spot in the center of the display of said oscilloscope coincident with a rotational position of said mirror midway between said spaced positions and a position of said mirror in the plane of its nodding motion midway between its extreme positions.

4. The combination of claim 2 further comprising: means for sensing a position of said mirror in the plane of its rotation midway between said spaced positions and for providing a signal coincident therewith; means for sensing a position of said mirror in the plane of its nodding motion midway between its extreme poistions and for providing a signal coincident therewith; and means selectively coupling said last two named sensing means to said beam producing means for providing a spot in the center of the display of said oscilloscope responsive to coincidence of said last two named signals.

5. A system for optically searching through a field of view defined by a first predetermined angle in an azimuth plane and a second predetermined angle in a vertical plane comprising: a flat mirror; means supporting said mirror for rotation about a first axis perpendicular with respect to said azimuth plane and for limited nodding motion about a second axis at right angles to said first axis and to said vertical plane; means operatively connected to said supporting means for continuously rotating the same about said first axis; means operatively connected to said mirror for simultaneously imparting limited nodding motion thereto through said second angle about said second axis; a cathode ray oscilloscope having electron beam producing means and vertical and horizontal beam deflection means; radiation detection means for receiving radiation reflected from said mirror and for providing a signal responsive thereto, said radiation detection means being stationary with respect to said azimuth and vertical planes, means coupling said detection means to said beam producing means for varying the intensity of said beam responsive to said signal; means operatively connected to said nodding motion imparting means for continuously deriving a signal directly related to the positions of said mirror in the plane of its nodding motion, means coupling said last named means to said vertical deflection means for providing vertical deflection of said beam responsive to said last-named signal; horizontal sweep voltage generating means coupled to said horizontal deflection means for providing horizontal sweep of said beam; means operatively associated with said supporting means for sensing two spaced apart rotational positions thereof defining said first angle therebetween and for respectively providing two signals coincident therewith, and means coupling said last named means to said horizontal sweep voltage generating means for respectively initiating and terminating said horizontal sweep responsive to said last named signals.

6. The combination of claim 5 further comprising: first means operatively associated with said supporting means for sensing a rotational position thereof midway between said spaced positions and for providing a first signal coincident therewith; second means operatively connected to said nodding motion imparting means for sensing a position of said mirror in the palne of its nodding motion midway between its extreme positions and for providing a second signal coincident therewith; and means selectively coupling said first and second means to said beam producing means for providing a spot at the center of the display of said oscilloscope responsive to coincidence of said first and second two signals.

7. A system for optically searching through a field of view defined by a first predetermined angle in an azimuth plane and a second predetermined angle in a vertical plane comprising: a flat elliptical mirror; a yoke member having a pair of arms disposed on either side of said mirror and pivotally supporting the same for limited nodding motion about a first axis perpendicular with respect to said azimuth plane; said yoke member arms terminating in a gimbal bearing supporting said yoke member for rotation about a second axis and to said vertical plane at right angles to said first axis; means operatively connected to said yoke member for continuously rotating the same; means operatively connected to said mirror for simultaneously imparting limited nodding motion thereto through said second angle; radiation detection means disposed concentrically with said gimbal bearing for receiving radiation reflected therethrough from said mirror and for providing a signal responsive thereto, said radiation detection means being stationary with respect to said azimuth and vertical planes; a cathode ray oscilloscope having electron beam producing means and vertical and horizontal deflection means, means coupling said beam producing means to said detection means for varying the intensity of said beam responsive to said signal; means operatively connected to said nodding motion imparting means for continuously deriving a signal directly related to the positions of said mirror in the plane of its nodding motion, means coupling said last named means to said vertical deflection means for providing vertical deflection of said beam responsive to said last-named signal; horizontal sweep voltage generating means coupled to said horizontal deflection means for providing horizontal sweep of said beam; a magnetic device on said gimbal bearing, a pair of reluctance pick up devices cooperating with said magnetic device on said gimbal bearing, said pick up devices being spaced apart and defining said first angle therebetween thereby respectively providing two signals coincident with two rotational positions of said yoke member, and means coupling said pick up devices to said horizontal sweep voltage generating means for respectively initiating and terminating said horizontal sweep responsive to said last named two signals.

8. The combination of claim 7 further comprising: a stationary Cassegrainian telescope for focusing said radiation from said mirror onto said detection means.

9. The combination of claim 7 further comprising: an optical filter disposed in the field of view of said mirror for passing radiation having predetermined spectral characteristics.

10. The combination of claim 7 further characterized in that said means coupling said beam producing means and said detecting means includes means for clipping said signal when the same is above a predetermined upper level and means for passing to said beam producing means only those signals which are above a predetermined lower level.

11. The combination of claim 7 further comprising: means operatively connected to said nodding motion imparting means for providing a signal coincident with a position of said mirror in the plane of its nodding motion intermediate its extreme positions; a third reluctance pick up device disposed midway between said pair of pick up devices and cooperating with said magnetic portion on said gimbal bearing to provide a signal coincident with a rotational position of said yoke member midway between said two positions; and means selectively coupling said last named means and said third pick-up device to said beam producing means for providing a spot at the center of the display of said oscilloscope responsive to coincidence of said last two named signals.

References Cited in the file of this patent

UNITED STATES PATENTS

| | | |
|---|---|---|
| 2,151,917 | Hyland | Mar. 28, 1939 |
| 2,155,509 | Schroter | Apr. 25, 1939 |
| 2,339,754 | Brace | Jan. 25, 1944 |
| 2,616,077 | Holser | Oct. 28, 1952 |
| 2,617,982 | Holschuh et al. | Nov. 11, 1952 |
| 2,653,185 | Lubcke et al. | Sept. 22, 1953 |
| 2,840,817 | Walters et al. | June 24, 1958 |
| 2,914,608 | Blackstone | Nov. 24, 1959 |
| 2,966,823 | Trimble | Jan. 3, 1961 |
| 2,968,735 | Kaufold et al. | Jan. 17, 1961 |
| 2,984,745 | Scherbatskoy | Mar. 16, 1961 |

FOREIGN PATENTS

| | | |
|---|---|---|
| 971,883 | France | Aug. 23, 1950 |

OTHER REFERENCES

Power Engineering, vol. 61, Number 1, January 1957, page 65.

UNITED STATES PATENT OFFICE
CERTIFICATE OF CORRECTION

Patent No. 3,087,986                      April 30, 1963

Kenneth L. De Brosse

It is hereby certified that error appears in the above numbered patent requiring correction and that the said Letters Patent should read as corrected below.

Column 6, line 5, for "poistions" read -- positions --; line 55, for "palne" read -- plane --; lines 71 and 72, strike out "and to said vertical plane", and insert the same after "axis" in line 72, same column 6.

Signed and sealed this 19th day of November 1963.

(SEAL)
Attest:

ERNEST W. SWIDER                       EDWIN L. REYNOLDS

Attesting Officer                      Acting Commissioner of Patents